(12) United States Patent
Bakker et al.

(10) Patent No.: US 7,489,654 B2
(45) Date of Patent: Feb. 10, 2009

(54) METHOD FOR DATA FLOW CONTROL IN A MOBILE COMMUNICATIONS SYSTEM

(75) Inventors: Hajo Bakker, Eberdingen (DE); Bernd Haberland, Stuttgart (DE); Anne Agin, Chatillon (FR)

(73) Assignee: ALCATEL, Paris (FR)

( * ) Notice: Subject to any disclaimer, the term of this patent is extended or adjusted under 35 U.S.C. 154(b) by 279 days.

(21) Appl. No.: 11/191,996

(22) Filed: Jul. 29, 2005

(65) Prior Publication Data

US 2006/0034168 A1  Feb. 16, 2006

(30) Foreign Application Priority Data

Aug. 13, 2004  (EP) ................. 04292052

(51) Int. Cl.
*H04B 1/16* (2006.01)
*H04B 1/26* (2006.01)
(52) U.S. Cl. ...................... 370/328; 370/229
(58) Field of Classification Search ........... 370/326, 370/328
See application file for complete search history.

(56) References Cited

U.S. PATENT DOCUMENTS

2005/0122900 A1* 6/2005 Tuulos et al. .............. 370/229

FOREIGN PATENT DOCUMENTS

EP  1 379 095 A1  1/2004

WO  WO 03/055167 A1  7/2003

OTHER PUBLICATIONS

3GPP TS 25.435 V5 6.0 (Dec. 2003)—3rd Generation Partnership Project; Technical Specification Group Radio Access Network; UTRAN Iub Interface User Plane Protocols for Common Transport Channel Data Streams (Release 5) pp. 1-44.

B. Haberland et al, "3G Evolution Towards High Speed Downlink Packet Access: The introduction of HSDPA will enhance 3G mobile systems by offering higher data rates in the downlink direction. The Evolium multi-standard base station architecture is ready for this evolution", Alcatel Telecommunicaitons Review, Alcatel Park, France, Oct. 2002, XP007009490.

* cited by examiner

*Primary Examiner*—William D Cumming
(74) *Attorney, Agent, or Firm*—Sughrue Mion, PLLC

(57) ABSTRACT

A method for controlling the flow of data between an RNC and a base station of a UMTS mobile communications system with HSDPA capability via an Iub interface, where an HS-DSCH Frame Protocol mechanism is implemented in the Iub interface to provide control and data services for the communication of HSDPA user data between the RNC and the base station, wherein a capacity overload control entity monitors information about actual Iub interface data transport flow, and when a determined Iub interface transport capacity value is reached, the data transport flow is reduced in the Iub interface.

7 Claims, 2 Drawing Sheets

METHOD FOR DATA FLOW CONTROL IN A MOBILE COMMUNICATIONS SYSTEM

BACKGROUND OF THE INVENTION

The invention is based on a priority application EP 04292052.0 which is hereby incorporated by reference The present invention relates to wireless communication systems, and more particularly, to data flow control in a mobile communications system.

The third generation (3G) evolution of Global Systems for Mobile communications (GSM) networks, commonly known as Universal Mobile Telecommunications Systems (UMTS), introduces High Speed Downlink Packet Access (HSDPA) to provide data rates up to approximately 10 Mbps to support packet-based multimedia services.

UMTS HSDPA capable systems support an additional transport channel type in the downlink direction, a High Speed Downlink Shared Channel (HS-DSCH). This logical channel provides the logical transport mechanism for data transfer.

Currently the 3rd Generation Partnership Project (3GPP) is undertaking the technical specification of HSDPA. 3GPP specification TS 25.435 v5.6.0, 2003-12, provides a description of the interface between a radio network controller (RNC) and a base station, being referred to as the Iub interface. In such document, and more specifically, in chapter 5.1.6, a data transfer procedure is defined for the transmission of HS-DSCH data frames from the RNC to the base station. A mechanism to control user data flow between the RNC and the base station is also implicit in such procedure.

Since the actual transport capacity on the Iub interface is limited, due to the fact that the base station will be connected to the RNC via one or several physical communication links, such as 2.048 Mbps (E1) links or 155 Mbps (STM-1) links, a disadvantage of the specified state of the art RNC-base station user data flow control approach is that it only controls individual user data flows, that is, how much HSDPA traffic an individual user can receive from the RNC. Based on the distribution of the user terminals and the quality of the air interface for a radio cell with HSDPA traffic and in case, for example, the base station needs to serve several of such cells, there is the probability that the total data transport flow in the Iub interface, that is the sum of all individual user data flow instances, exceeds the maximum available Iub interface transport capacity, i.e. a capacity overload situation occurs at the Iub interface.

SUMMARY OF THE INVENTION

It is the object of the invention to solve the aforesaid technical problems and provide an improved data flow control method for the Iub interface between the RNC and the base station.

The object is achieved by a method for controlling the flow of data between an RNC and a base station of a UMTS mobile communications system with HSDPA capability via an Iub interface, where an HS-DSCH Frame Protocol mechanism is implemented in the Iub interface to provide control and data services for the communication of HSDPA user data between the RNC and the base station, the method comprising the steps of:

sending an HS-DSCH Capacity Request control message from the RNC towards the base station indicating a total amount of user data waiting in the RNC, in order to request data transport capacity, sending an HS-DSCH Capacity Allocation control message from the base station towards the RNC granting the amount of data the RNC is allowed to send within a period of time, the RNC sending the granted amount of user data information to the base station by means of an HS-DSCH Data Frame message, a capacity overload control entity monitoring information about actual total Iub interface data transport flow, and when a determined Iub interface transport capacity value is reached, reducing the data transport flow in the Iub interface.

The object is also achieved by a capacity overload control entity of a UMTS mobile communication system with HSDPA capability comprising means for detecting and/or calculating and/or receiving information about actual Iub interface data transport flow; means for analyzing said information and determining if it has reached a certain threshold value; means for communicating with a radio network controller and means for sending to the radio network controller information about the actual Iub interface data transport flow or an indication that the actual total Iub interface data transport flow has reached a certain Iub interface transport capacity value;

a radio network controller of a UMTS mobile communication system with HSDPA capability comprising means for communicating with a base station via an Iub interface by means of an HS-DSCH Frame Protocol mechanism; means for detecting and/or calculating and/or receiving and/or sending information about actual Iub interface data transport flow; means for analyzing said information and determining if a certain Iub interface transport capacity value has been reached or for receiving an indication that the actual total Iub interface data transport flow has reached a certain Iub interface transport capacity value; means for sending a capacity threshold indication in an HS-DSCH frame protocol message to the base station or means for transmitting to the base station an amount of user data which is less than a previously allocated amount of data granted by that base station;

and a base station of a UMTS mobile communication system with HSDPA capability comprising means for communicating with a RNC via an Iub interface by means of an HS-DSCH Frame Protocol mechanism; means for receiving a capacity threshold indication; means to analyze said capacity threshold indication and to react to it by sending an HS-DSCH Capacity Allocation control message towards the RNC reducing the amount of data the RNC is allowed to send within a period of time.

Advantageous configurations of the invention emerge from the dependent claims, the following description and the drawings. For example, it is seen advantageous that, by using the proposed invention, efficient usage of the transport capacity on the Iub interface for HSDPA traffic is achieved. It is also seen advantageous that the Iub interface data flow control method hereinafter described is used for a selective group of users thus providing the mobile network operator with a way of differentiating the user quality of service and charge for such service accordingly. Furthermore, the invention provides an overall data flow control for HSDPA traffic on the Iub interface.

BRIEF DESCRIPTION OF THE DRAWINGS

An embodiment example of the invention is now explained with the aid of FIGS. 1 to 4.

DETAILED DESCRIPTION OF THE DRAWINGS

Figure 1:
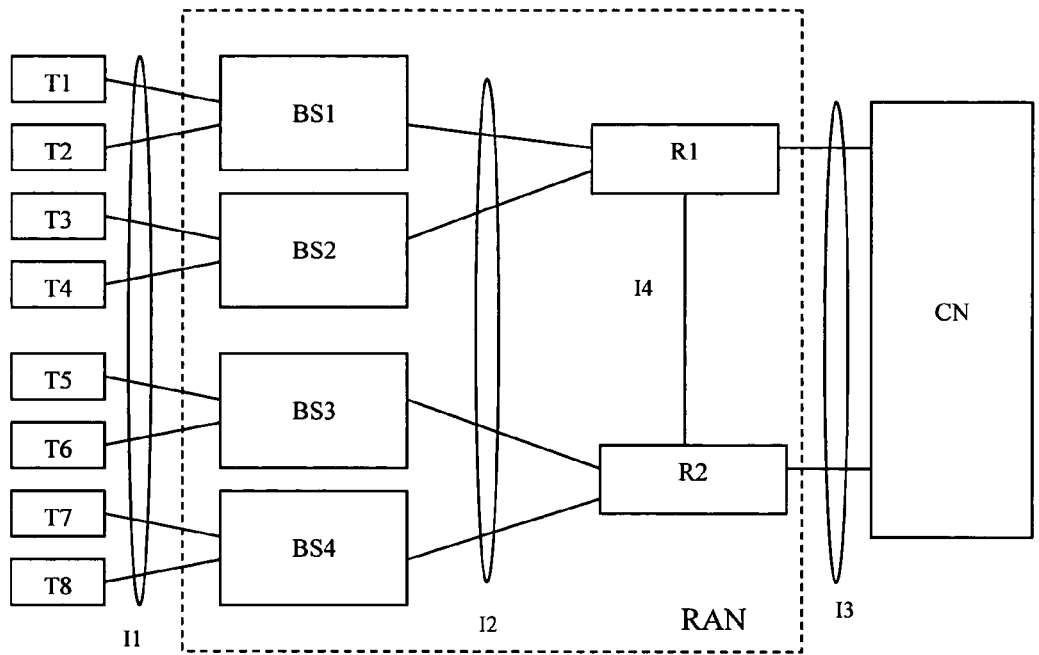
FIG. 1 shows a simplified basic network element architecture of a conventional mobile communication system.

FIG. 1 shows an example of a basic network element architecture of a conventional mobile communication system comprising a core network CN connected via interface I3 to a radio access network RAN which communicates via an air interface I1 with eight user terminals T1 to T8. The radio access network RAN comprises four base stations BS1 to BS4 controlled by two radio network controllers R1 and R2. The RNCs R1 and R2 are connected among themselves via interface I4 and are connected to the base stations via the Iub interface I2. The Iub interface I2 and the other network element interfaces I1, I3, I4 are also being specified by 3GPP. In such specifications it is also common that the terminals are referred to as user equipment (UE) and the base stations as Node Bs.

Figure 2:
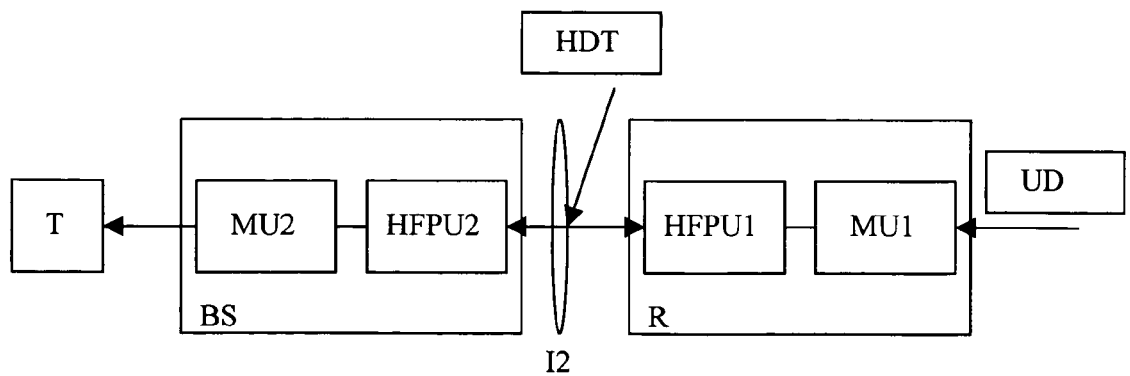
FIG. 2 shows a simplified block diagram being illustrative of the communication between RNC, base station and user terminal in a conventional UMTS HSDPA mobile communication system.

FIG. 2 shows an embodiment where the RNC R transfers user data UD by means of HS-DSCH Data Frames HDT to a base station BS via the Iub interface I2 and the base station transmits said user data to the user terminal T.

In operation, the RNC receives user data UD, e.g. multimedia data such as video sequence, from the core network. User data UD is segmented in the RNC R in a Medium Access Control (MAC) protocol entity MU1 to provide MAC data packets, which are also referred to as MAC-d protocol data units (PDUs). Said MAC-d PDUs in the RNC are passed to an HS-DSCH frame protocol entity HFPU1 responsible for the HSDPA Iub Interface communication between the RNC R and the base station BS. User data in form of MAC-d PDUs is then transferred to the base station BS in an HS-DSCH Data Frame HDT by using the control and data services of the HS-DSCH frame protocol entity HFPU1 and HFPU2.

Once received in the base station BS, the HS-DSCH frame protocol entity HFPU2 passes the user data MAC-d PDUs to MAC protocol entity MU2 which concatenates several of such MAC-d PDUs to form MAC-hs PDUs which are transmitted to the HSDPA capable user terminal T.

Figure 3:
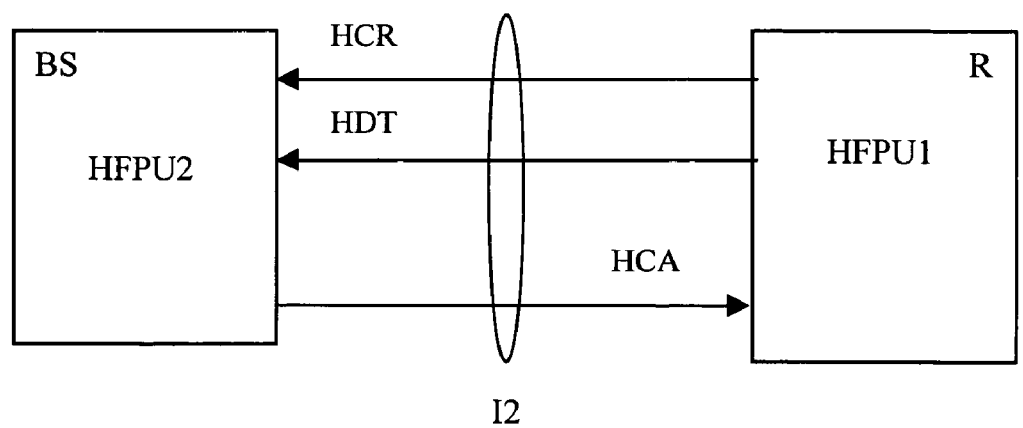
FIG. 3 shows a block diagram being illustrative of a conventional data transfer procedure for the transmission of HS-DSCH Data Frames from RNC to base station.

In FIG. 3 it is illustrated with more detail the HSDPA Iub interface I2 HS-DSCH frame protocol service for the transmission of HS-DSCH Data Frames HDT from RNC R to base station BS.

An HS-DSCH Capacity Request procedure provides means for the RNC R to request HS-DSCH capacity, that is, the reception of data packets in the RNC is signalled towards the base station BS by means of a HS-DSCH Capacity Request control message HCR, which includes the total amount of data waiting, i.e. user buffer size, in the RNC.

The base station BS will grant transport resources to the RNC by means of a HS-DSCH Capacity Allocation control message HCA, which defines the amount of data, i.e. size and number of MAC-d PDUs, the RNC is allowed to send within a defined time period. The base station BS may generate an HS-DSCH Capacity Allocation control message HCA either in response to an HS-DSCH Capacity Request or at any other time, and the base station BS may use this message to control individual user data flow and modify the capacity at any time, irrespective of the reported user buffer status.

Based on the granted transfer capacity by the base station, the RNC proceeds by sending user data in HS-DSCH Data Frames HDTs to the base station. Each HS-DSCH Data Frame includes besides the MAC-d PDUs also an indication about the remaining user data, i.e. buffer size in the RNC, which might be used by the base station for the issue of a new HS-DSCH Capacity Allocation control message HCA.

Figure 4:
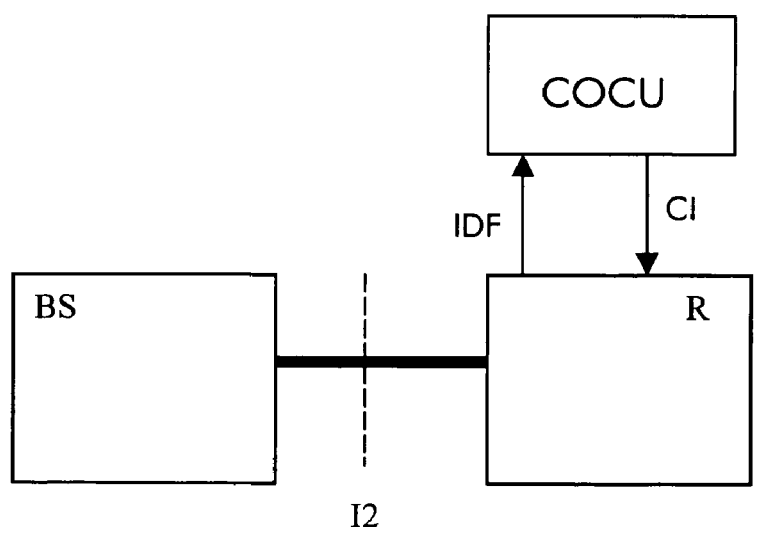
FIG. 4 shows a block diagram being illustrative of a method for controlling the flow of data between an RNC and a base station of a mobile communications system with HSDPA capability according to the invention.

FIG. 4 shows an embodiment illustrating a method for data flow control between an RNC R and a base station BS according to the invention. The embodiment of FIG. 4 shows a UMTS mobile communications system with HSDPA capability comprising network elements RNC, base station and capacity overload control entity COCU according to the invention. The capacity overload control entity COCU is connected to RNC R, and the RNC is connected to base station BS via Iub interface I2.

The capacity overload control entity COCU according to the invention is designed so that it monitors information about actual Iub interface data transport flow IDF, that is, for example, it has means to detect and/or calculate and/or receive information about dedicated channel (DCH) traffic, HSDPA traffic, control traffic and total Iub interface capacity available for data transport towards a base station BS. The capacity overload control entity COCU is further designed so that when a determined Iub interface transport capacity value is reached it generates a capacity threshold indication CI and sends it to the RNC.

Upon reception of the capacity threshold indication CI from the capacity overload control entity COCU, and according to the invention, the RNC sends said capacity threshold indication CI in an HS-DSCH frame protocol message to the base station, and the base station reacts to said message by sending an HS-DSCH capacity allocation control message towards the RNC reducing the amount of data the RNC is allowed to send within a period of time.

The Iub interface I2 transport capacity value can be determined for example to a certain percentage value below the maximum transport capacity of the Iub interface I2 or set to the maximum transport capacity of that Iub interface. In the first case, when that value is reached, the capacity overload control entity COCU sends to the RNC a capacity threshold indication CI that a critical load situation occurs, and in the second case the capacity overload control entity COCU sends to the RNC a capacity threshold indication CI that an overload situation occurs. In case, for example, that the capacity overload control entity COCU indicates to the RNC an overload situation and this indication is transferred to the base station, the base station can reduce the amount of data the RNC is allowed to send to a value of zero.

For sending the capacity threshold indication CI to the base station, the RNC can use for example an HS-DSCH Data Frame message and code the specific capacity threshold indication CI in a determined bit field of such message. But it is also possible that the RNC uses another HS-DSCH frame protocol message.

It is also possible that the capacity overload control entity COCU sends to the RNC at certain periods of time current Iub interface I2 transport capacity or data transport flow information so that the RNC can react and take decisions based on this information.

An alternative way, according to the invention, of indicating to the base station that a certain Iub interface I2 transport capacity value has been reached, can be done the following way: upon reception of the capacity threshold indication CI from the capacity overload control entity COCU, the RNC transmits to the base station an amount of user data which is less than the previously allocated amount of data granted by that base station. The base station reacts to said behavior from the RNC by sending an HS-DSCH Capacity Allocation control message towards the RNC reducing the amount of data the RNC is allowed to send within a period of time. For example, in case the capacity overload control entity COCU generates a capacity threshold indication CI indicating an Iub interface overload situation, the RNC can react by sending to the base station an HS-DSCH Data Frame message with no user data inside, thus the base station recognizes the meaning of this RNC behavior and interprets it as an overload situation. The base station in this case can react by generating a HS-DSCH Capacity Allocation control message towards the RNC reducing the amount of data the RNC is allowed to send within a period of time to zero.

As already mentioned above, it is seen advantageous that by using the data flow control method according to the invention the operator of the mobile communications network can avoid Iub interface overload situations and provide a more reliable and efficient data user transport service between the radio network controller and the base stations. Furthermore, when a determined load situation is reached in the Iub interface, the operator can reduce the data transport flow for a determined number of users based on low priority of data or low quality service offered to such users, thus allowing the other high quality service customers to keep receiving data without being affected by an overload situation.

In a preferred embodiment of the invention the capacity overload control entity COCU is located within the RNC, said capacity overload control entity being implemented in a hardware and/or software form, but it can also be located in another network element of the mobile communications system or as a standalone entity in such network systems.

For the sake of generalization, it shall also be understood that means to carry out the method or certain steps of the method for controlling the flow of data between an RNC and a base station of a UMTS mobile communications system with HSDPA capability herein described can be located anywhere in the mobile communications system, that is, in a base station or any resource manager entity of the mobile communication system. Said means being implemented in hardware or software form.

The invention claimed is:

1. A method for controlling the flow of data between a radio network controller (RNC) and a base station of a Universal Mobile Telecommunications Systems (UMTS) mobile communications system with High Speed Downlink Packet Access (HSDPA) capability via an Iub interface, where a High Speed Downlink Shared Channel(HS-DSCH) Frame Protocol mechanism is implemented in the Iub interface to provide control and data services for the communication of HSDPA user data between the RNC and the base station, the method comprising:

sending an HS-DSCH Capacity Request control message from the RNC towards the base station indicating a total amount of user data waiting in the RNC, in order to request data transport capacity;

sending an HS-DSCH Capacity Allocation control message from the base station towards the RNC granting the amount of data the RNC is allowed to send within a period of time;

the RNC sending the granted amount of user data information to the base station by means of an HS-DSCH Data Frame message; and a capacity overload control entity monitoring information about actual total Iub interface data transport flow, and when a determined Iub interface transport capacity value is reached, reducing the data transport flow in the Iub interface, wherein the Iub interface is an interface between the RNC and the base station.

2. The method of claim 1, wherein:

when the determined Iub interface transport capacity value is reached, the capacity overload control entity generates a capacity threshold indication and sends it to the RNC;

the RNC sends said capacity threshold indication in an HS-DSCH frame protocol message to the base station; and the base station reacts to said message by sending an HS-DSCH Capacity Allocation control message towards the RNC reducing the amount of data the RNC is allowed to send within a period of time.

3. The method of claim 1, wherein:

when the determined Iub interface transport capacity value is reached, the capacity overload control entity generates a capacity threshold indication and sends it to the RNC;

the RNC transmits to the base station an amount of user data which is less than the previously allocated amount of data granted by that base station; and the base station reacts to said RNC behavior by sending an HS-DSCH Capacity Allocation control message towards the RNC reducing the amount of data the RNC is allowed to send within a period of time.

4. The method of claim 1, wherein the information about the actual Iub interface data transport flow monitored by the capacity overload control entity is the dedicated channel traffic, HSDPA traffic, control traffic, and total Iub interface capacity available for data transport towards the base station.

5. The method according to claim 2, wherein the capacity threshold indication is a critical load situation indication, indicating that a certain percentage value below the maximum transport capacity of the Iub interface has been reached, or an overload situation indication, indicating that the maximum transport capacity value of the Iub interface has been reached.

6. The method according to claim 1, wherein the data transport flow is reduced in the Iub interface by reducing the data transport flow of determined individual users depending on operator-customer service criteria.

7. A method for controlling the flow of data between a radio network controller (RNC) and a base station of a Universal Mobile Telecommunications Systems (UMTS) mobile communications system with High Speed Downlink Packet Access (HSDPA) capability via an Iub interface, the method comprising:

sending a message from the RNC towards the base station indicating a total amount of user data waiting in the RNC;

sending a message from the base station towards the RNC granting the amount of data the RNC is allowed to send within a period of time;

the RNC sending the granted amount of user data information to the base station; and monitoring information about actual total Iub interface data transport flow, and when a determined Iub interface transport capacity value is reached, reducing the data transport flow in the Iub interface, wherein the Iub interface is an interface between the RNC and the base station.

* * * * *